United States Patent
Esumi (10) Patent No.: US 11,457,114 B2
(45) Date of Patent: Sep. 27, 2022

(54) IMAGE FORMING APPARATUS AND IMAGE FORMING METHOD THAT PERFORM INSPECTION USING LINE SENSORS

(71) Applicant: Konica Minolta, Inc., Tokyo (JP)

(72) Inventor: Yoshihiro Esumi, Tokyo (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 17/231,286

(22) Filed: Apr. 15, 2021

(65) Prior Publication Data
US 2021/0385346 A1    Dec. 9, 2021

(30) Foreign Application Priority Data

Feb. 19, 2020  (JP) .............................. JP2020-026037

(51) Int. Cl.
*H04N 1/04*      (2006.01)
*H04N 1/00*      (2006.01)
*H04N 1/203*     (2006.01)

(52) U.S. Cl.
CPC ..... *H04N 1/00708* (2013.01); *H04N 1/00588* (2013.01); *H04N 1/00702* (2013.01); *H04N 1/00748* (2013.01); *H04N 1/00761* (2013.01); *H04N 1/2032* (2013.01); *H04N 2201/0081* (2013.01); *H04N 2201/0082* (2013.01)

(58) Field of Classification Search
CPC ........... H04N 1/00708; H04N 1/00588; H04N 1/00702; H04N 1/00748; H04N 1/00761; H04N 1/2032; H04N 2201/0081; H04N 2201/0082
USPC ....................................... 358/3.26, 408, 496
See application file for complete search history.

(56) References Cited

U.S. PATENT DOCUMENTS

| | | | |
|---|---|---|---|
| 2016/0162762 A1* | 6/2016 | Maeda | H04N 1/00779 358/1.18 |
| 2016/0286063 A1* | 9/2016 | Isokawa | G03G 15/5062 |
| 2021/0377412 A1* | 12/2021 | Tokuma | H04N 1/0066 |

FOREIGN PATENT DOCUMENTS

JP    2019-9573 A    1/2019

* cited by examiner

*Primary Examiner* — Cheukfan Lee
(74) *Attorney, Agent, or Firm* — Osha Bergman Watanabe & Burton LLP (57) ABSTRACT

An image forming apparatus includes: a conveyor that transports a sheet; an image former that forms an image on front and back surfaces of the sheet being transported in a transportation path and forms marks on the front and back surfaces; a reader that comprises a first line sensor that is disposed on a front surface side and reads the front surface; and a second line sensor that is disposed on a back surface side and reads the back surface; and a controller that: calculates a positional deviation between the images formed on the front and back surfaces based on positions of the marks on the front surface read by the first line sensor and positions of the marks on the back surface read by the second line sensor, and controls the image former to adjust positions of the images formed on the front and back surfaces.

9 Claims, 8 Drawing Sheets

IMAGE FORMING APPARATUS AND IMAGE FORMING METHOD THAT PERFORM INSPECTION USING LINE SENSORS

CROSS-REFERENCE TO RELATED APPLICATIONS

This application claims priority from Japanese Patent Application No. 2020-26037, filed on Feb. 19, 2020, the contents of which are incorporated herein by reference in their entirety.

BACKGROUND

Technical Field

The present invention relates to an image forming apparatus, an image forming method and a recording medium.

Description of the Related Art

In an image forming apparatus, a line sensor is arranged in a transportation path for a sheet on which an image has been formed and the image read by the line sensor is used for inspection and automatic image adjustment. In inspection, the size of the sheet on which the image has been formed is checked and the position of the image formed on the sheet is also checked. Since the sheet may shrink due to the heat in the image forming process or the like, it is important to check the size of the sheet. Therefore, the image forming apparatus must check the size of the sheet in consideration of the possibility of shrinkage of the sheet and enable an image forming section to form an image in an adequate position on the sheet according to the sheet size. If as a result of inspection it is found that the image forming position is not adequate, the position of the image to be formed on the next sheet must be adjusted.

Basically, the line sensor which is used for such inspection should have a sufficient width to scan the entire width of the sheet on which the image forming apparatus forms an image. For example, in the case of an image forming apparatus which forms an image on an A3 sheet, its line sensor should have a length equal to or larger than the width of an A3 sheet.

However, a line sensor which has a length equal to or larger than the width of an A3 sheet is very expensive and if an A3 or larger sheet is to be inspected, the production cost of the image forming apparatus would be higher.

Depending on the scanning condition, it is only necessary to scan some part of the sheet other than the peripheral part or the like of the sheet. However, in any case, in order to scan a sheet larger than A3, a line sensor which has a length larger than usual is required.

Japanese Unexamined Patent Application Publication No. 2019-9573 (Patent Literature 1) describes a technique that line sensors with a limited length are arranged in a manner to be staggered in the sheet width direction on the front and back sides of the transportation path and after the sheet with an image formed is read by a line sensor on the front side, the sheet is reversed and read by a line sensor on the back side. Since the sheet is reversed and the image formed on the sheet is read by the line sensors on both sides, the image on the entire surface of the sheet can be read even if the length of each line sensor is equal to or smaller than the sheet width.

Patent Literature 1: Japanese Unexamined Patent Application Publication No. 2019-9573

However, when the front and back surfaces of a sheet are reversed as described in Japanese Unexamined Patent Application Publication No. 2019-9573 (Patent Literature 1), the time required to read one sheet will be longer and the number of sheets per unit time on which an image is formed will be smaller, resulting in deterioration in the working efficiency of the image forming apparatus.

Therefore, there is a need that inspection of a large sheet can be performed efficiently using line sensors with a limited length without reversing the front and back surfaces of the sheet.

SUMMARY

One or more embodiments of the present invention provide an image forming apparatus which can perform inspection efficiently using line sensors with a length equal to or smaller than the width of a sheet, an image forming method, and a recording medium.

According to one or more embodiments of the present invention, an image forming apparatus comprises: a conveyor which transports a sheet; an image forming section (i.e., image former) which forms an image on the front surface and the back surface of the sheet being transported in a transportation path of the conveyor and forms marks for position detection on the front surface and the back surface of the sheet; a reader which includes a first line sensor located on a first surface side midway in the transportation path to read the front surface of the sheet on which the image forming section has formed an image, and a second line sensor located on a second surface side opposite to the first surface side, midway in the transportation path to read the back surface of the sheet on which the image forming apparatus has formed an image; and a controller which performs control to calculate and adjust a positional deviation between the image formed on the front surface of the sheet and the image formed on the back surface of the sheet according to positions of the marks on the front surface of the sheet read by the first line sensor and positions of the marks on the back surface of the sheet read by the second line sensor.

Here, when viewed in the sheet width direction perpendicular to the transportation direction of the sheet in the transportation path, the first line sensor and the second line sensor are arranged so that the detection range of the first line sensor on the first surface and the detection range of the second line sensor on the second surface partially overlap on the front and back surfaces of the sheet and the detection range of the first line sensor on the first surface and the detection range of the second line sensor on the second surface which do not overlap on the front and back surfaces of the sheet extend in one direction and the other direction of the sheet width direction in the first line sensor and the second line sensor.

According to one or more embodiments of the present invention, an image forming method comprises: an image forming process to form an image on a front surface and a back surface of a sheet being transported in a transportation path and form marks for position detection on the front surface and the back surface of the sheet; a reading process to read the sheet on which the image has been formed by the image forming process, using a first line sensor to read the image formed on the front surface of the sheet on a first surface side and a second line sensor to read the image formed on the back surface of the sheet on a second surface side opposite to the first surface side; and a control process to calculate and adjust a positional deviation between the image formed on the front surface of the sheet and the image formed on the back surface of the sheet according to positions of the marks on the front surface of the sheet read by the first line sensor and positions of the marks on the back surface of the sheet read by the second line sensor.

Here, when viewed in a width direction of the sheet perpendicular to a transportation direction of the sheet in the transportation path, the first line sensor and the second line sensor to perform the reading process are arranged so that a detection range of the first line sensor on the first surface and a detection range of the second line sensor on the second surface partially overlap on the front and back surfaces of the sheet and the detection range of the first line sensor on the first surface and the detection range of the second line sensor on the second surface which do not overlap on the front and back surfaces of the sheet extend in one direction and the other direction of the sheet width direction in the first line sensor and the second line sensor.

Furthermore, a recording medium according to one or more embodiments of the present invention is a non-transitory computer-readable recording medium storing a program causing a computer to perform the processes of the above image forming method.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

[Configuration of the Image Forming Apparatus]

Figure 1:
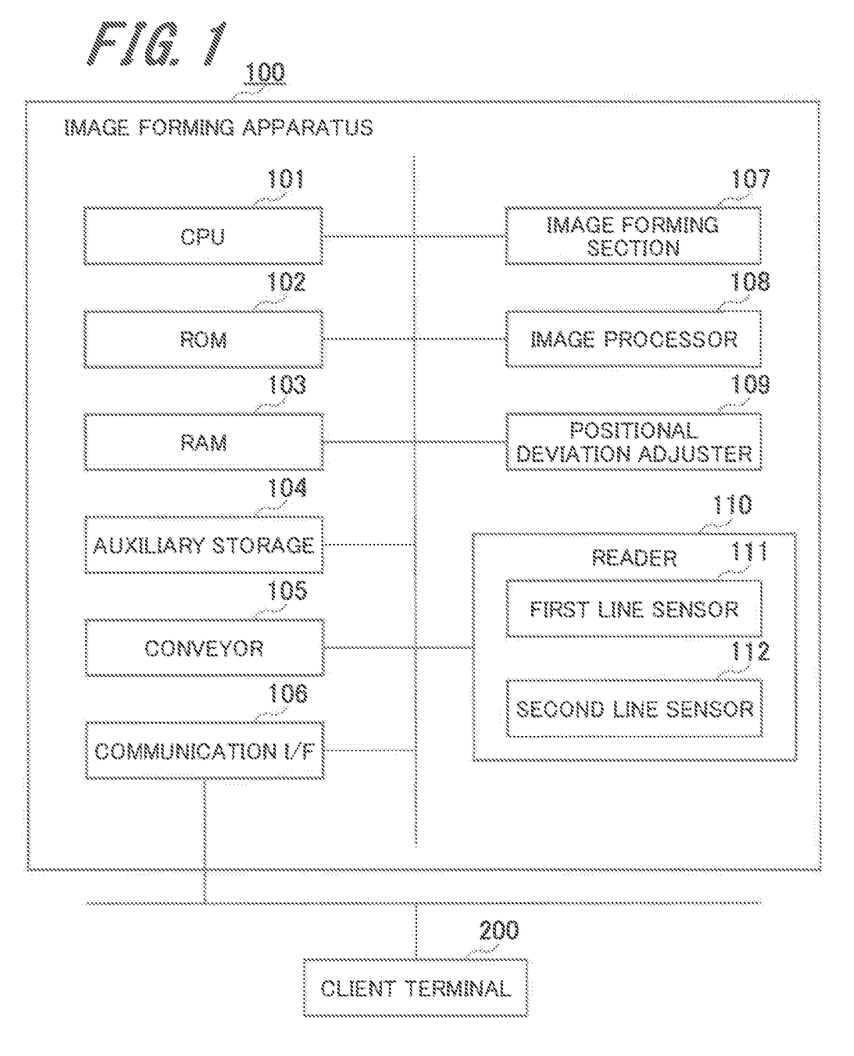
FIG. 1 is a block diagram which shows an example of the configuration of an image forming apparatus according to one or more embodiments of the present invention.

FIG. 1 is a block diagram which shows the configuration of an image forming apparatus 100 according to one or more embodiments.

The image forming apparatus 100 includes a CPU (Central Processing Unit) 101, a ROM (Read Only Memory) 102, a RAM (Random Access Memory) 103, an auxiliary storage 104, a conveyor 105, and a communication interface 106 (communication I/F in the figure).

The image forming apparatus 100 further includes an image forming section 107, an image processor 108, a positional deviation adjuster 109, and a reader 110. These components are connected with each other via a bus so that they can transmit and receive data mutually.

The image forming apparatus 100 is configured to communicate with a client terminal 200 through the communication interface 106 and a printing job or the like is transmitted from the client terminal 200 to the image forming apparatus 100.

The CPU 101 (an example of the controller) is an arithmetic processing unit which controls the components of the image forming apparatus 100 and performs various types of arithmetic processing. The CPU 101 reads a program code of software (hereinafter called the "program") to implement the functions according to one or more embodiments, from the ROM 102 or auxiliary storage 104 and executes it. The image forming apparatus 100 may include another type of arithmetic processing unit such as an MPU (Micro-Processing Unit) instead of the CPU 101.

The ROM 102 is a nonvolatile recording medium which stores various programs and data to enable the image forming apparatus 100 to function.

The RAM 103 temporarily stores programs or data as a working area. For example, various data which are generated during arithmetic processing by the CPU 101, such as variables and parameters, are temporarily written in the RAM 103.

The auxiliary storage 104 is a storage unit which plays an auxiliary role for the RAM 103 and has a capacity to be able to store large volumes of data. The auxiliary storage 104 may store not only an operating system and various parameters, but also various programs to enable the image forming apparatus 100 to function. The auxiliary storage 104 may be an HDD (hard disk drive), but instead it may be an SSD (Solid State Drive), flexible disk, optical disk, magnetooptical disk, CD-ROM, CD-R, magnetic tape, nonvolatile memory card or the like.

The conveyor 105 performs transportation of a sheet on which the image forming apparatus 100 forms an image. Specifically, the conveyor 105 takes out the sheets loaded on a paper tray (not shown) onto a transportation path one by one and transports the sheets to a delivery tray (not shown) on the transportation path. The conveyor 105 uses a belt or rollers to transport the sheets. The image forming section 107 and reader 110 are located on the transportation path through which the sheets are transported.

The communication interface 106 performs communication with an external device connected through a network, such as the client terminal 200. For example, the communication interface 106 receives image data for image formation and printing job data from the client terminal 200.

The image forming section 107 performs the process to form an image on the front and back surfaces of the sheet transported from the paper tray by the conveyor 105, by discharging ink or a similar method. For example, the image forming section 107 performs the image forming process to form an image of four colors, yellow (Y), magenta (M), cyan (C), and black (K), using an ink jet head.

The use of an ink jet head by the image forming section 107 is merely one example and another method may be used to form an image.

The image processor 108 performs processing of image data which the image forming section 107 uses to form an image on a sheet. Specifically, the image processor 108 rasterizes the image data acquired from the client terminal 200 to convert it into rasterized data for image formation to drive the ink jet head, etc. provided in the image forming section 107 and supplies the converted rasterized data to the image forming section 107.

The image processor 108 performs an adjustment process if it is necessary to adjust the size, etc. of the image to be formed on the sheet by the image forming section 107.

The positional deviation adjuster 109 detects a positional deviation between the image formed on the front surface of the sheet and the image formed on the back surface of the sheet and corrects the detected positional deviation. This positional deviation correction process is performed under the control by the CPU (controller) 101. A concrete example of detection of a positional deviation will be explained later.

The reader 110 includes a first line sensor 111 to read the front surface of the sheet on which an image has been formed by the image forming section 107, and a second line sensor 112 to read the back surface of the sheet on which an image has been formed by the image forming section 107. The first line sensor 111 and second line sensor 112 are located between the image forming section 107 in the sheet transportation path and the delivery tray (not shown).

The first line sensor 111 and the second line sensor 112 have three rows of imaging elements arranged in the sheet width direction perpendicular to the sheet transportation direction and the imaging elements in the rows output an output signal depending on the intensity of R (red), G (green), and B (blue) waveform components of incident light. The imaging element for each of R, G, and B may be a CCD (Charge Coupled Device) sensor with a photodiode as a photoelectric conversion element or a CMOS (Complementary Metal Oxide Semiconductor) sensor in which a color filter to transmit the light of the R, G or B waveform component is placed in its light receiving part.

In one or more embodiments, the first line sensor 111 and the second line sensor 112 are line sensors which are shorter in length than the width (length in the direction perpendicular to the transportation direction) of the largest size sheet on which the image forming section 107 can form an image, though further details will be given later.

[Arrangement of the Line Sensors]

Figure 2:
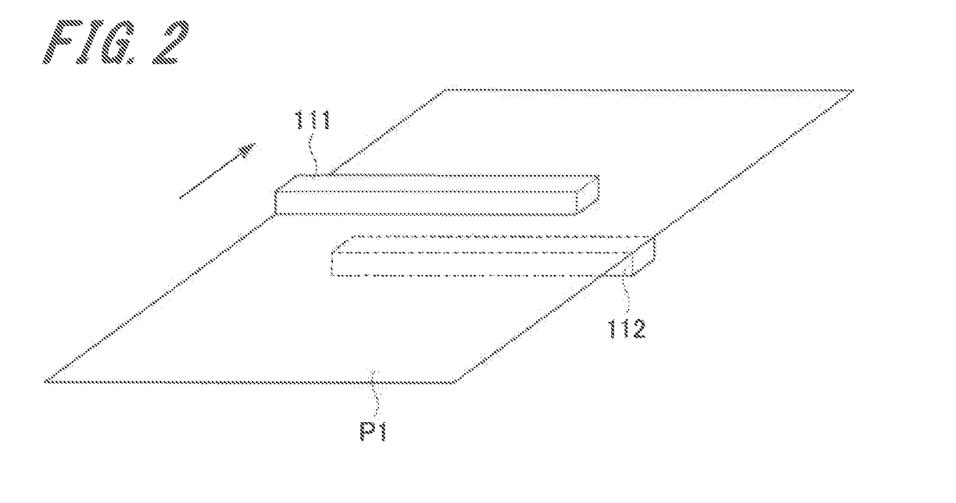
FIG. 2 is a perspective view which roughly shows the arrangement of line sensors according to one or more embodiments of the present invention.
Figure 3:
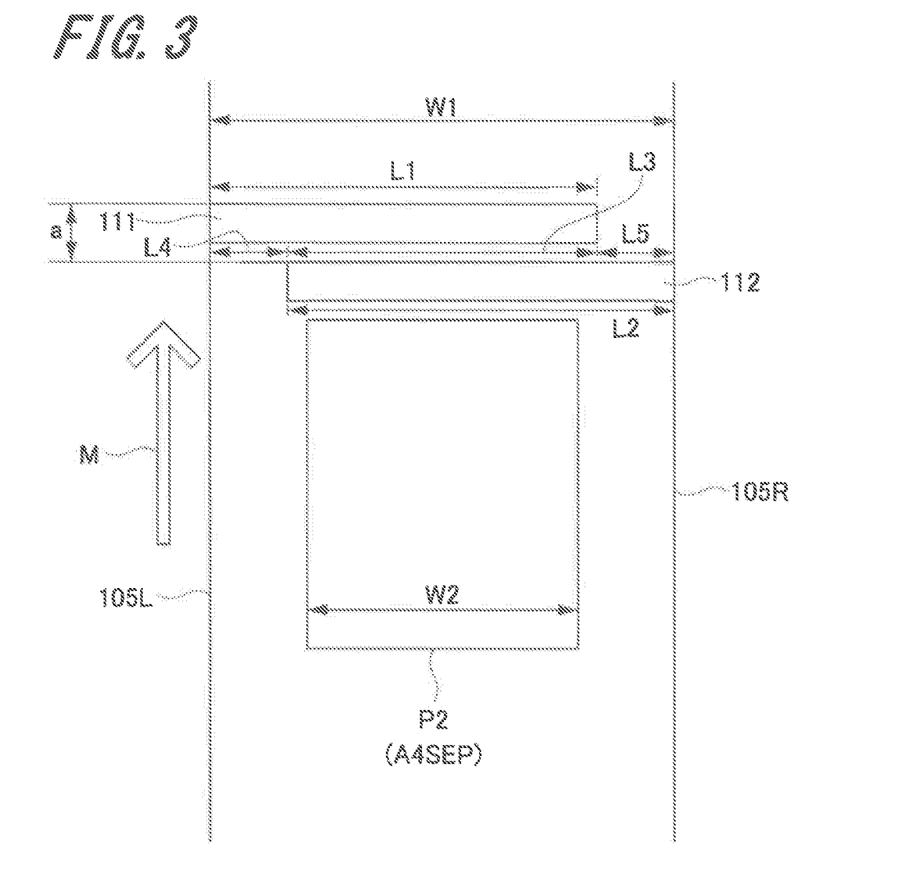
FIG. 3 is a top view of the arrangement of the line sensors according to one or more embodiments of the present invention as seen from above the transportation path.

FIG. 2 and FIG. 3 show a concrete arrangement of the first line sensor 111 and second line sensor 112.

FIG. 2 shows that the first line sensor 111 and second line sensor 112 are reading the sheet P1 being transported.

As shown in FIG. 2, the first line sensor 111 is located on a first surface (the upper surface of the sheet P1 in FIG. 2) to read the front surface of the sheet P1 being transported and the second line sensor 112 is located on a second surface (the lower surface of the sheet P1 in FIG. 2) to read the back surface of the sheet P being transported. The sheet P1 shown in FIG. 2 is the largest size sheet on which the image forming apparatus 100 according to one or more embodiments can form an image.

FIG. 3 is a plan view which shows the arrangement of the first line sensor 111 and second line sensor 112 as seen from above the transportation path. When the transportation path is seen from above, the second line sensor 112 to read the back surface of the sheet is hidden behind the sheet, but FIG. 3 shows the position of the first line sensor 111 and the position of the second line sensor 112 in a manner that the front and back surfaces of the sheet overlap each other.

In FIG. 3, 105L denotes the left end of the transportation path, 105R denotes the right end of the transportation path, and arrow M denotes the direction in which the sheet moves on the transportation path. When the largest size sheet on which the image forming apparatus 100 can form an image is transported on the transportation path, the left end of the sheet being transported moves on the left end 105L of the transportation path and the right end of the sheet being transported moves on the right end 105R of the transportation path. In other words, when the transportation path transports the largest size sheet, the sheet is transported using the entire width W1 of the transportation path as shown in FIG. 3. The transportation path has width W1 of 350 mm and can transport a sheet called SRA3, the short side of which has a length exceeding 300 mm. The short side length of an SRA3 sheet is 330 mm.

Here, the first line sensor 111 and second line sensor 112 have the respective lengths L1 and L2, for example, 308 mm which is shorter than the width W1 of the transportation path.

The first line sensor 111 is placed with one end aligned with the left end 105L of the transportation path and the second line sensor 112 is placed with one end aligned with the right end 105R of the transportation path. Consequently, the two line sensors 111 and 112 are arranged so that their detection regions partially overlap each other and the non-overlapping portions of the detection regions extend in one direction and the other direction perpendicularly to the transportation direction.

Therefore, the first line sensor 111 and second line sensor 112 have a region L3 in which the reading ranges overlap, a region L4 in which reading is performed only by the first line sensor 111, and a region L5 in which reading is performed only by the second line sensor 112. However, the first line sensor 111 reads the front surface of the sheet and the second line sensor 112 reads the back surface of the sheet; namely the line sensors 111 and 112 read the different surfaces of the sheet.

The first line sensor 111 to read the front surface of the sheet and the second line sensor 112 to read the back surface of the sheet are spaced by a prescribed distance a. The reason that the first line sensor 111 and second line sensor 112 are spaced by the prescribed distance a is to eliminate the influence of the other line sensor 112 or 111 during reading by the line sensor 111 or 112.

As shown in FIG. 3, for example, when a sheet P2 of A4 SEF size with a short side length W2 of 210 mm is transported in the center of the transportation path, the line sensors 111 and 112 which have lengths L1 and L2 of 308 mm respectively can read the entire width of each surface of the sheet P2. In other words, if the lengths L1 and L2 are both 308 mm, length L3 of the region in which the two line sensors 111 and 112 overlap is 266 mm. If the sheet has a short side with a length equal to or smaller than 266 mm, the entire width of the sheet on both the surfaces can be read by the two line sensors 111 and 112 without special processing.

[Example of Reading by the Line Sensors]

Figure 4A:
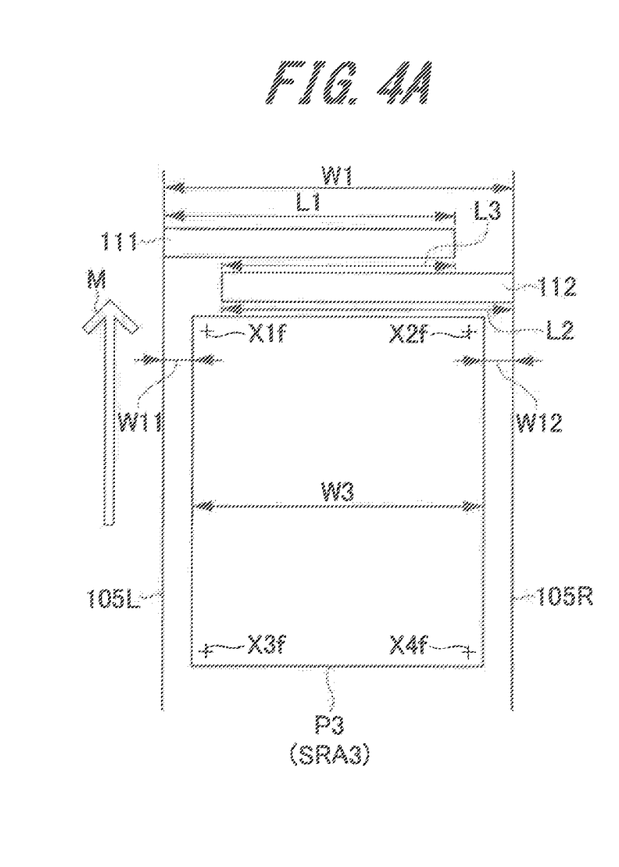
FIG. 4A shows the positional relation between the line sensors and a sheet of a specific size (SRA3) when the sheet is read.
Figure 4B:
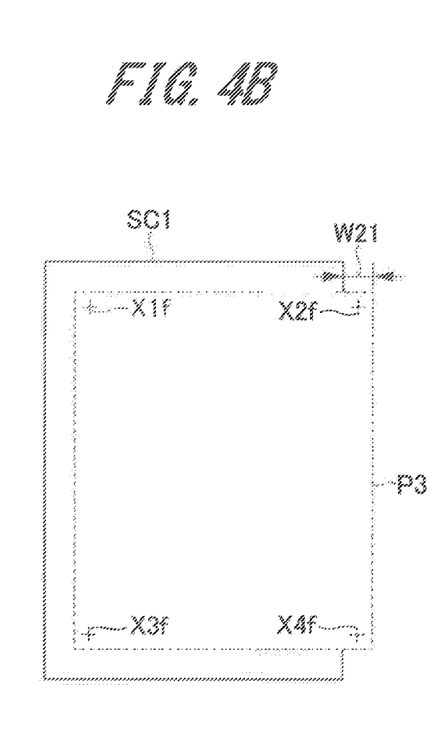
FIG. 4B shows the image read by the first line sensor.
Figure 4C:
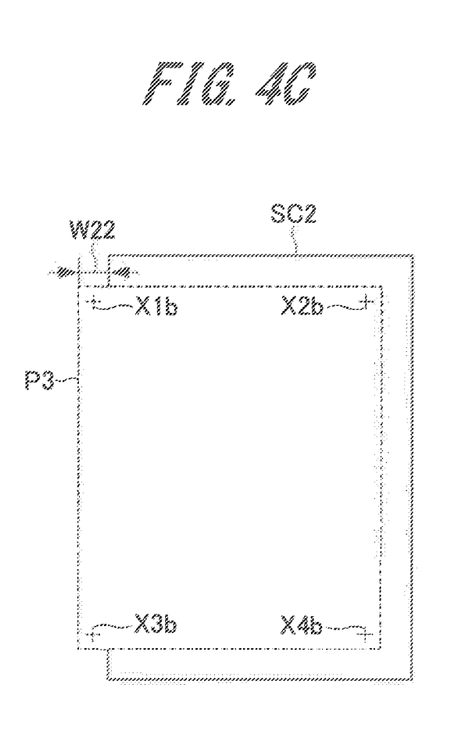
FIG. 4C shows the image read by the second line sensor.

FIG. 4A to FIG. 4C show the positional relation between the line sensors 111 and 112 and a sheet P3 of a specific size (SRA3) when the sheet P3 is read (FIG. 4A), the image read by the first line sensor 111 (FIG. 4B), and the image read by the second line sensor 112 (FIG. 4C), respectively.

The sheet P3 of SRA3 size has a short side W3 of 330 mm and as shown in FIG. 4A, when it is transported almost in the center of the transportation path, the distance W11 from the left end 105L of the transportation path to the left end of the sheet and the distance W12 from the right end 105R of the transportation path to the right end of the sheet are both 10 mm.

Therefore, the region read by the first line sensor 111 on the front surface of the sheet P3 and the region read by the second line sensor 112 on the back surface of the sheet P3 are part of each surface and a region which cannot be read is generated on each surface.

Specifically, FIG. 4B shows an image SC1 which is read by the first line sensor 111 and FIG. 4C shows an image SC2 which is read by the second line sensor 112.

For example, in the image SC1 read by the first line sensor 111, a region with width W21 which cannot be read is generated at the right end of the sheet as shown in FIG. 4B.

Also, in the image SC2 read by the second line sensor 112, a region with width W22 which cannot be read is generated at the left end of the sheet as shown in FIG. 4C.

When forming an image, as shown in FIG. 4A, the image forming section 107 prints cross-shaped marks X1$f$ to X4$f$ called register marks, which indicate reference positions for image formation, in the four corners of the front surface of the sheet P3. Similarly, as shown in FIG. 4C, the image forming section 107 prints cross-shaped marks X1$b$ to X4$b$ in the four corners of the back surface of the sheet P3. Usually, these marks X1$f$ to X4$f$ and X1$b$ to X4$b$ are positioned in the four corners of the printed images on the respective surfaces and used to judge the position of the formed image and also used as references to determine the cutting position in the process after printing. Correctly, the positions at which the marks X1$f$ to X4$f$ are formed on the front surface of the sheet should coincide with the positions at which the marks X1$b$ to X4$b$ are formed on the back surface of the sheet. Here, coincidence means that when the sheet is seen through, the marks on the front surface and the marks on the back surface are not out of alignment.

When the marks X1$f$ to X4$f$ and X1$b$ to X4$b$ are printed in this way, in the image SC1 read by the first line sensor 111, among the four marks X1$f$ to X4$f$ on the front surface the two right marks X2$f$ and X4$f$ are not detected as shown in FIG. 4B. Similarly, in the image SC2 read by the second line sensor 112, among the four marks X1$b$ to X4$b$ on the back surface the two left marks X1$b$ and X3$b$ are not detected as shown in FIG. 4C.

Since the line sensors 111 and 112 in one or more embodiments are arranged as mentioned above, if the short side length of the sheet is larger than L3 (266 mm), or length of the region in which the two line sensors 111 and 112 overlap, it would be impossible to read the entire sheet.

However, the image forming apparatus 100 according to one or more embodiments makes it possible to detect a sheet with a short side length larger than the length L3 of the region in which the two line sensors 111 and 112 overlap, under the control by the CPU 101. In order to detect the size of the sheet with a short side length larger than the length L3 of the region in which the two line sensors 111 and 112 overlap, the CPU 101 performs the process to measure the amount of sensor positional deviation when the two line sensors 111 and 112 are viewed in an overlapping manner and register the amount of deviation in the auxiliary storage 104.

[Flow of Steps to Measure and Register the Amount of Sensor Positional Deviation]

Figure 5:
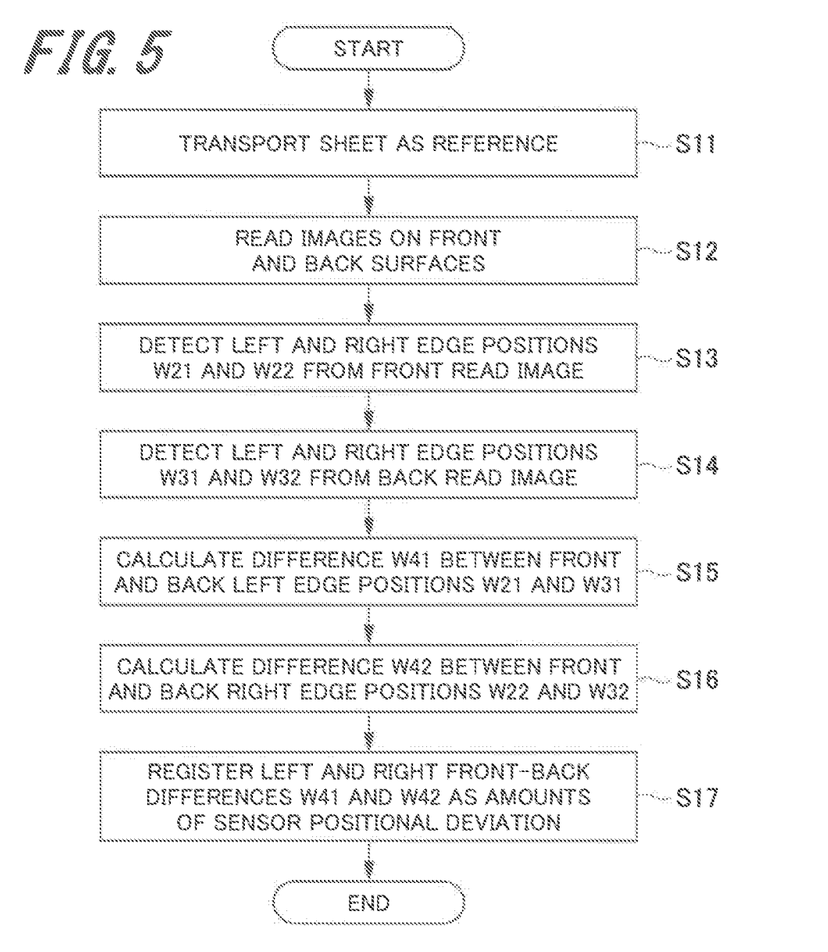
FIG. 5 is a flowchart which shows the flow of the steps to register the amount of sensor positional deviation according to one or more embodiments of the present invention.

FIG. 5 is a flowchart which shows the flow of steps for the image forming apparatus 100 according to one or more embodiments to measure the amount of sensor positional deviation when the two line sensors 111 and 112 are viewed in an overlapping manner and register it in the auxiliary storage 104.

Figure 6:
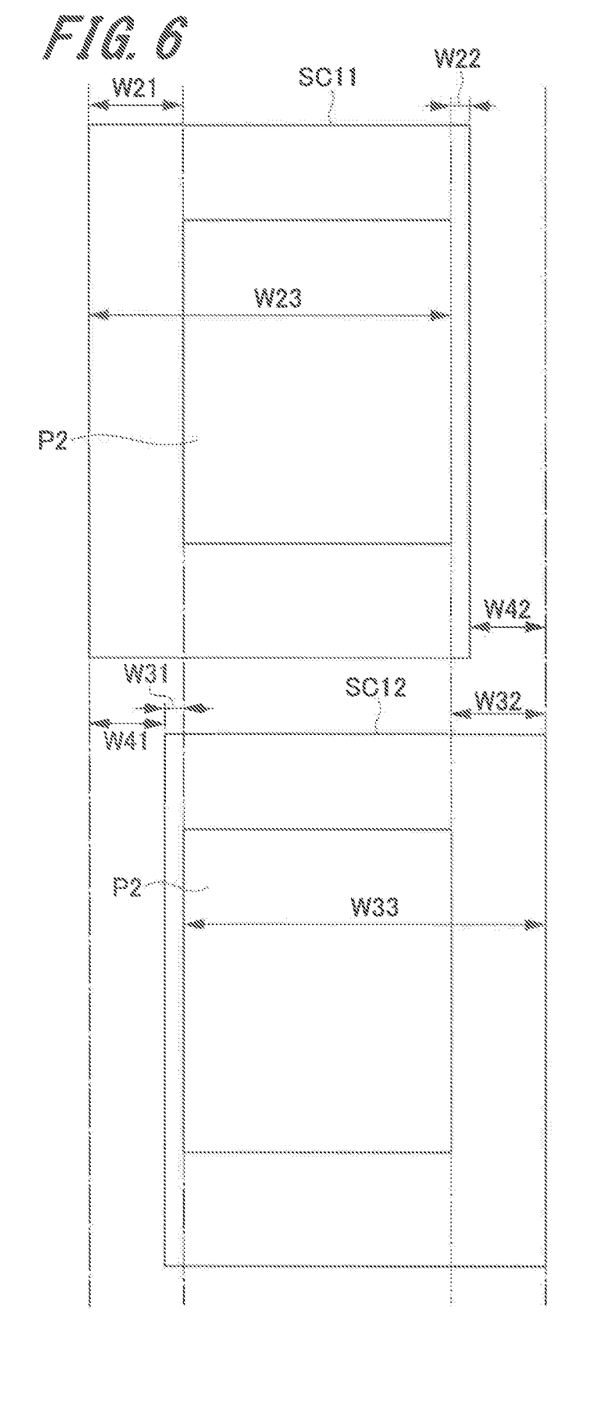
FIG. 6 is a diagram which explains the amount of sensor positional deviation to be registered according to one or more embodiments of the present invention.

FIG. 6 shows a read image SC11 on the front surface and a read image SC12 on the back surface when the amount of sensor positional deviation is measured according to FIG. 5.

First, in order to measure the amount of sensor positional deviation, a sheet with a short side width smaller than L3 (FIG. 3 and FIG. 4), or length of the overlapping detection range of the two line sensors 111 and 112, is prepared as a reference sheet and the CPU 101 causes the conveyor 105 to transport the reference sheet (Step S11). For example, a sheet P2 of A4SEP size as shown in FIG. 3 (width W2: 210 mm) is prepared and transported by the conveyor 105. At this time, the image forming section 107 need not form an image on the sheet.

Then, the CPU 101 causes the first line sensor 111 to read the front surface of the sheet and the second line sensor 112 to read the back surface of the sheet (Step S12).

Then, the CPU 101 detects left and right edge positions W21 and W22 of the front surface of the sheet from the image SC11 read by the first line sensor 111 on the front surface (Step S13). Specifically, as shown in the upper half of FIG. 6, the CPU 101 takes the distance between the left end of the sheet P2 included in the read image SC11 on the front surface and the left end of the read image SC11 as left edge position W21. Also, the CPU 101 takes the distance between the right end of the sheet P2 included in the read image SC11 on the front surface and the right end of the read image SC11 as right edge position W22.

Then, the CPU 101 detects left and right edge positions W31 and W32 of the back surface of the sheet from the image SC12 read by the second line sensor 112 on the back surface (Step S14). Specifically, as shown in the lower half of FIG. 6, the CPU 101 takes the distance between the left end of the sheet P2 included in the read image SC12 on the back surface and the left end of the read image SC12 as left edge position W31. Also, the CPU 101 takes the distance between the right end of the sheet P2 included in the read image SC12 on the back surface and the right end of the read image SC12 as right edge position W32.

After these positions are detected, the CPU 101 calculates the difference between the left edge position W21 on the front surface and the left edge position W31 on the back surface (difference W41 as shown in FIG. 6) (Step S15). Furthermore, the CPU 101 calculates the difference between the right edge position W22 on the front surface and the right edge position W32 on the back surface (difference W42 as shown in FIG. 6) (Step S16).

Then, the CPU 101 registers (stores) the calculated left and right edge position differences W41 and W42 as the amounts of sensor positional deviation which are information on relative positional relation between the first line sensor 111 and the second line sensor 112, in the auxiliary storage 104 (Step S17).

The step to register the amount of sensor positional deviation as explained in the flowchart of FIG. 5 is carried out as necessary, for example, when initial settings are made during production or installation of the image forming apparatus 100 and also at the time of maintenance checkup.

[Flow of Steps to Form an Image on a Sheet with a Large Width]

Figure 7:
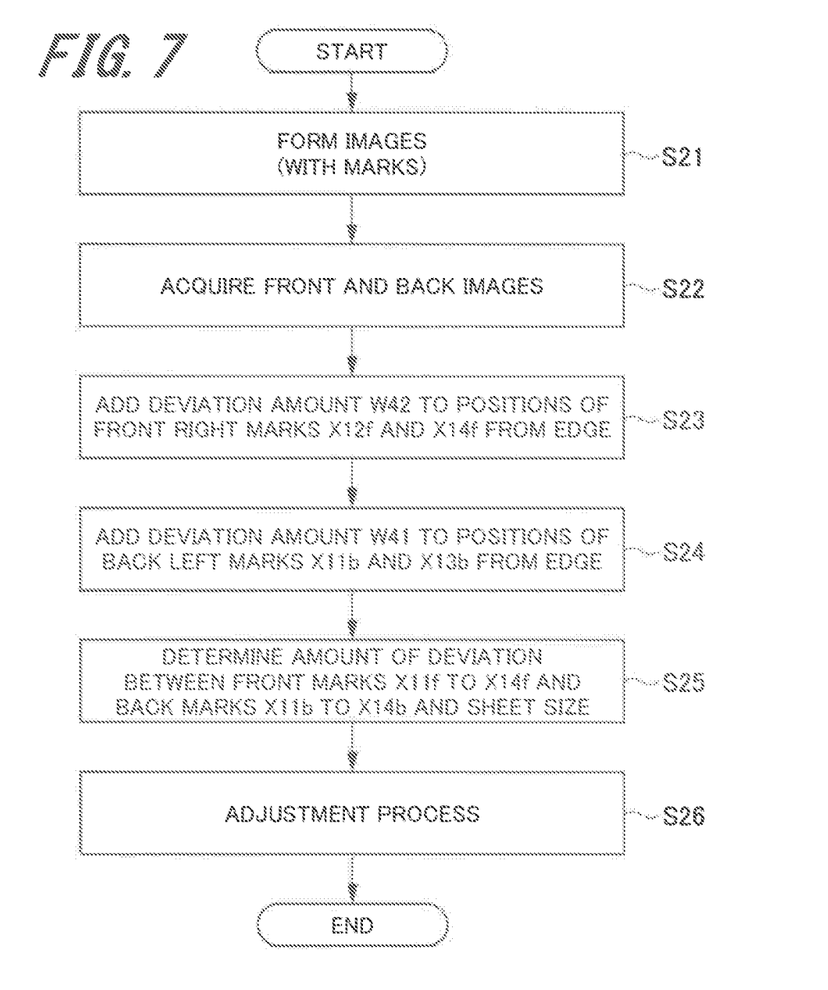
FIG. 7 is a flowchart which shows the flow of the adjustment process according to detection of marks on a sheet according to one or more embodiments of the present invention.

FIG. 7 is a flowchart which shows the flow of steps to determine the sheet size and the amount of deviation from the images scanned by the two line sensors 111 and 112 when an image is formed on a sheet with a width larger than L3 (FIG. 3), or length of the overlapping detection range of the two line sensors 111 and 112.

Figure 8:
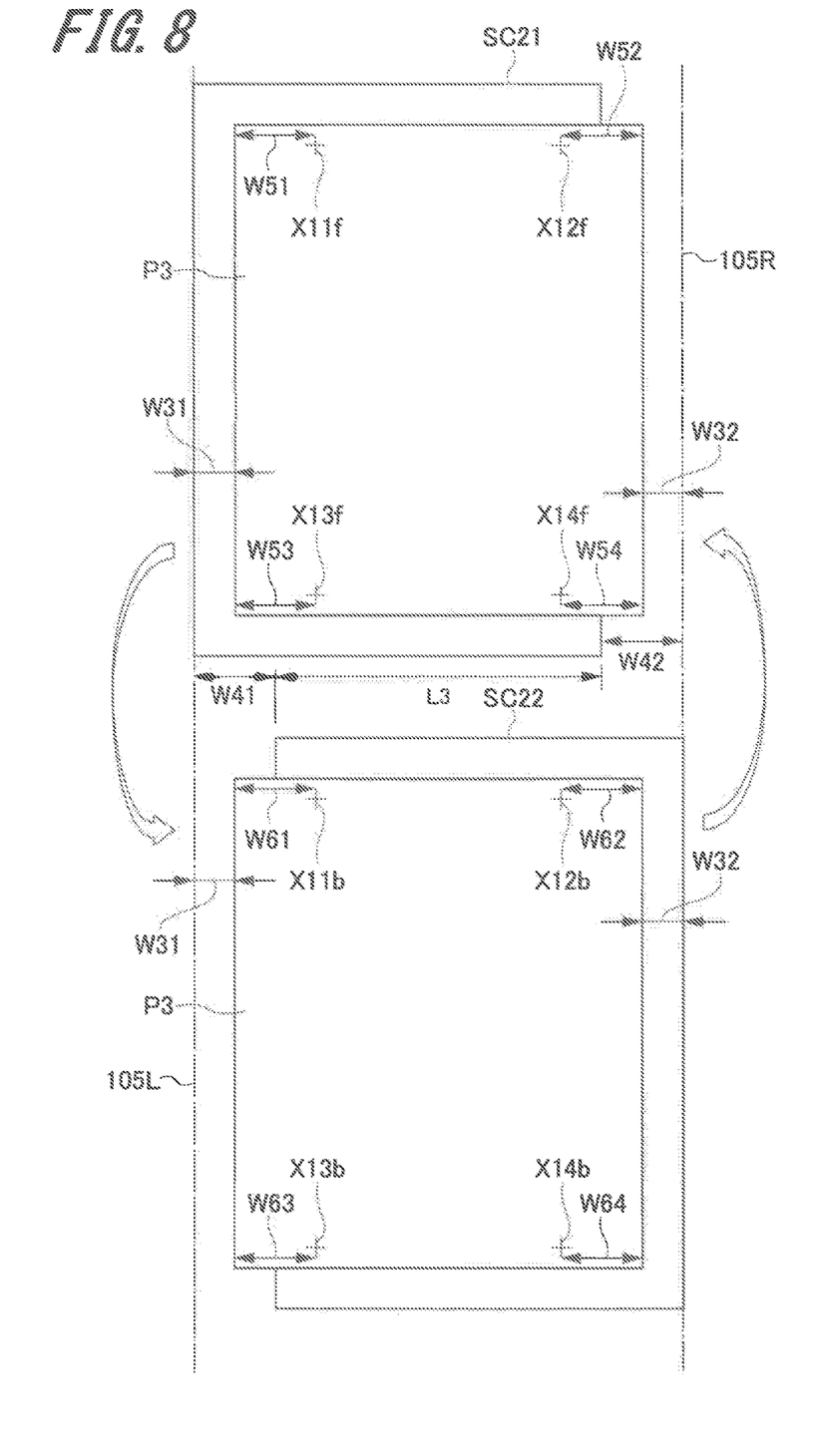
FIG. 8 is a diagram which explains the example of the adjustment process in FIG. 7.

FIG. 8 shows a read image SC21 on the front surface and a read image SC22 on the back surface when the steps to determine the sheet size and the amount of deviation according to FIG. 7 are carried out.

In this case, a sheet P3 of SRA3 size with a short side length of 330 mm is used as the sheet.

First, the image forming section 107 of the image forming apparatus 100 forms an image on the front and back surfaces of the sheet (Step S21). At this time, the image forming section 107 prints (forms) cross-shaped marks called register marks on the front and back surfaces of the sheet.

For example, as shown in FIG. 8, cross-shaped marks X11f to X14f are printed in the four corners of the front surface of the sheet P3 of SRA3 size and cross-shaped marks X11b to X14b are printed in the four corners of the back surface of the sheet P3. In one or more embodiments, these marks X11f to X14f should be printed in the region L3 in which the reading ranges of the first line sensor 111 and second line sensor 112 overlap.

More specifically, as shown in the upper half of FIG. 8, the two left marks X11f and X13f among the marks X11f to X14f in the four corners of the front surface of the sheet P3 should be at distances W51 and W53 from the left end of the sheet P3, respectively. The two right marks X12f and X14f should be at distances W52 and W54 from the right end of the sheet P3, respectively. As a consequence, the marks X11f to X14f are set in the region L3 in which the reading ranges of the first line sensor 111 and second line sensor 112 overlap.

Also, as shown in the lower half of FIG. 8, the two left marks X11b and X13b among the marks X11b to X14b in the four corners of the back surface of the sheet P3 should be at distances W61 and W63 from the left end of the sheet P3, respectively. The two right marks X12b and X14b should be at distances W62 and W64 from the right end of the sheet P3, respectively. As a consequence, the marks X11b to X14b are set in the region L3 in which the reading ranges of the first line sensor 111 and second line sensor 112 overlap.

The positions of the printed marks X11f to X14f of the front surface of the sheet P3 and the positions of the printed marks X11b to X14b of the back surface of the sheet P3 should overlap when the sheet P3 is seen through, as far as the marks are printed correctly.

Referring back to the flowchart of FIG. 7, the reader 110 of the image forming apparatus 100 reads the front surface and back surface of the sheet P3 on which the images have been formed at Step S21 and acquires the read images (Step S22). As a result of reading, a front surface read image SC21 and a back surface read image SC22 are acquired as shown in FIG. 8.

After the read images SC21 and SC22 are acquired, the CPU 101 of the image forming apparatus 100 adds the previously determined amount of deviation W42 to the right edge positions of the two right marks X12f and X14f which are detected on the front surface read image SC21 (Step S23).

Also, the CPU 101 of the image forming apparatus 100 adds the previously determined amount of deviation W41 to the left edge positions of the two left marks X11b and X13b which are detected on the back surface read image SC22 (Step S24). By adding the amounts of deviation W41 and W42 in this way, the detected positions of the marks X11f to X14f and X11b to X14b are converted into distances measured between the left end 105L and right end 105R of the transportation path.

Then, the CPU 101 of the image forming apparatus 100 determines the amount of deviation between the positions of the marks X11f to X14f in the four corners of the front surface of the sheet P3 and the positions of the marks X11b to X14b in the four corners of the back surface of the sheet P3 and also determines the size of the sheet P3 (Step S25).

When the CPU 101 determines the size of the sheet P3, the position of the right end of the front surface of the sheet P3 is determined using the distance W32 from the right end 105R of the transportation path to the right end of the sheet P3 which is detected on the back surface read image SC22.

Similarly, when the CPU 101 determines the size of the sheet P3, the position of the left end of the back surface of the sheet P3 is determined using the distance W31 from the left end 105L of the transportation path to the left end of the sheet P3 which is detected on the front surface read image SC21.

Then, the CPU 101 of the image forming apparatus 100 determines whether adjustment is necessary or not, according to the sheet size determined at Step S25, the positions of the marks X11f to X14f in the four corners of the front surface, and the positions of the marks X11b to X14b in the four corners of the back surface. If the CPU 101 determines that adjustment is necessary, it instructs the positional deviation adjuster 109 to make an adjustment and the positional deviation adjuster 109 adjusts the position of the image to be formed on the sheet (Step S26). Step S26 is reflected in image formation on subsequent sheets.

As described so far, the image forming apparatus 100 according to one or more embodiments can check the position of an image formed on the front and back surfaces of a sheet with a width larger than the detection length of the line sensors, simply by letting the sheet pass the line sensors without reversing the sheet. Consequently, when an image is formed, inspection can be efficiently performed using short inexpensive line sensors.

Specifically, the image forming apparatus 100 according to one or more embodiments can correctly detect the size of a sheet and the positions of marks on the front and back surfaces of the sheet and accurately inspect the image forming condition, using the line sensors 111 and 112 as the reader 110, though the length of the line sensors 111 and 112 is shorter than the width of the transportation path. Therefore, the reader 110 which can make a front-back surface adjustment with high accuracy can be provided at low cost. In addition, since there is no need to reverse the sheet for reading, reading can be efficiently performed.

Variations

The present invention is not limited to the above embodiments and may be modified or changed without departing from the gist of the present invention.

For example, the numerical values given for the length of the line sensors 111 and 112, sheet size, etc. in the description of the above embodiments are just examples, but these numerical values are not limited to those given in the above embodiments.

Furthermore, in the above embodiments, as the marks to be formed on the front and back surfaces of the sheet, cross-shaped marks called register marks have been explained as an example. However, signs with a different shape may be printed on the sheet instead of these marks.

Furthermore, in the process to measure the amount of sensor positional deviation as explained according to the flowchart of FIG. 5, marks are printed on both the surfaces of the sheet. However, instead, in the process to measure the amount of sensor positional deviation, a transparent or translucent sheet with transmittivity may be used so that the marks printed only on the front surface of the sheet are read. Consequently, the positions of the marks on the front and back surfaces always completely coincide and the marks can be used as a reference to measure the amount of sensor positional deviation.

Furthermore, the arrangement of the first line sensor 111 and the second line sensor 112 as shown in FIGS. 2 and 3 is just one example and the arrangement is not limited to the example. For example, though the first line sensor 111 and the second line sensor 112 are spaced by distance a in the sheet transportation direction as shown in FIG. 3, instead they may be arranged in the same position in the transportation direction, as far as the line sensors 111 and 112 do not interfere with each other in reading.

Furthermore, in the above embodiments, the reader 110 is built in the image forming apparatus 100. Alternatively, the reader 110 may be installed in a device other than the image forming apparatus 100 so that the other device receives and processes the sheet on which the image forming apparatus 100 has formed an image.

Alternatively, arithmetic processing to detect the sheet size and the positions of the marks may be performed by a computer connected to the image forming apparatus 100. In this case, a computer-readable recording medium such as a semiconductor memory or disk of any kind can be mounted in the computer connected to the image forming apparatus 100, in which the recording medium stores the program (software) causing the computer to perform the processes explained referring to the flowcharts of FIG. 5 and FIG. 7 as the computer reads the program.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMERALS

100 image forming apparatus
101 CPU
102 ROM
103 RAM
104 auxiliary storage
105 conveyor
105L left end of transportation path
105R right end of transportation path
106 communication interface
107 image forming section
108 image processor
109 positional deviation adjuster
110 reader
111 first line sensor
112 second line sensor
200 client terminal

What is claimed is:

1. An image forming apparatus comprising:
a conveyor that transports a sheet having front and back surfaces in a transportation path along a transportation direction;
an image former that:
forms an image on at least one of the front and back surfaces of the sheet being transported in the transportation path, and
forms marks for position detection on the front and back surfaces;
a reader that comprises:
a first line sensor that is disposed on a front surface side and midway in the transportation path and that reads the front surface; and
a second line sensor that is disposed on a back surface side and midway in the transportation path and that reads the back surface, wherein
when viewed in a width direction of the sheet perpendicular to the transportation direction, the first and second line sensors are disposed such that:
a first detection range of the first line sensor on the front surface partially overlaps a second detection range of the second line sensor on the back surface; and
a part of the first detection range and a part of the second detection range that do not overlap each other extend in one direction and another direction along the sheet width direction, and
the marks are formed in four corners of the first detection range and in four corners of the second detection range;
a storage that stores relative positional information between a position detected by the first line sensor and a position detected by the second line sensor, wherein the relative positional information is measured based on images that are formed by the image former on the sheet with a width smaller than a region in which the first and second detection ranges overlap each other and that are read by the first and second line sensors, and
a controller that:
calculates:
a positional deviation between the images formed on the front and back surfaces based on positions of the marks on the front surface read by the first line sensor and positions of the marks on the back surface read by the second line sensor,
a size of the sheet read by the second line sensor from a sheet edge position detected by the first line sensor and the relative positional information, and
a size of the sheet read by the first line sensor from a sheet edge position detected by the second line sensor and the relative positional information, and
controls the image former to adjust positions of the images formed on the front and back surfaces.

2. The image forming apparatus according to claim 1, wherein the controller controls the image former to adjust the positions based on the calculated sheet size and the images read by the first and second line sensors.

3. The image forming apparatus according to claim 1, wherein the marks are formed in four corners of a region in which the first and second detection ranges overlap each other.

4. The image forming apparatus according to claim 1, wherein
a sheet with transmittivity is used for measurement of the relative positional information, and
an image formed on either one of the front and back surfaces is read by both the first and second line sensors.

5. An image forming method comprising:
forming an image on at least one of front and back surfaces of a sheet being transported in a transportation path along a transportation direction;
forming marks for position detection on the front and back surfaces;
reading the front surface using a first line sensor disposed on a front surface side and
reading the back surface using a second line sensor disposed on a back surface side, wherein when viewed in a width direction of the sheet perpendicular to the transportation direction, the first and second line sensors are disposed such that:
  a first detection range of the first line sensor on the front surface partially overlaps a second detection range of the second line sensor on the back surface; and
  a part of the first detection range and a part of the second detection range that do not overlap each other extend in one direction and another direction along the sheet width direction, and
  the marks are formed in four corners of the first detection range and in four corners of the second detection range;
storing, in a storage, relative positional information between a position detected by the first line sensor and a position detected by the second line sensor, wherein the relative positional information is measured based on images that are formed on the sheet with a width smaller than a region in which the first and second detection ranges overlap each other and that are read by the first and second line sensors;
calculating:
  a positional deviation between the images formed on the front and back surfaces based on positions of the marks on the front surface read by the first line sensor and positions of the marks on the back surface read by the second line sensor;
  a size of the sheet read by the second line sensor from a sheet edge position detected by the first line sensor and the relative positional information; and
  a size of the sheet read by the first line sensor from a sheet edge position detected by the second line sensor and the relative positional information; and
adjusting positions of the images formed on the front and back surfaces.

6. The image forming method according to claim 5, wherein the images to be formed on the sheet are adjusted based on the calculated sheet size and an image read in the first detection range and an image read in the second detection range.

7. The image forming method according to claim 5, the marks are formed in four corners of a region in which the first and second detection ranges overlap each other.

8. The image forming method according to claim 5, wherein
a sheet with transmittivity is used for measurement of the relative positional information, and
an image formed on either one of the front and back surfaces is read by both the first and second line sensors.

9. A non-transitory computer-readable recording medium storing a program causing a computer to execute:
controlling an image forming apparatus that comprises a first line sensor that is disposed on a front surface side and reads a front surface of a sheet being transported in a transportation path along a transportation direction, and a second line sensor that is disposed on a back surface side and reads a back surface of the sheet, wherein
  when viewed in a width direction of the sheet perpendicular to the transportation direction, a first detection range of the first line sensor on the front surface partially overlaps a second detection range of the second line sensor on the back surface, and
  a part of the first detection range and a part of the second detection range that do not overlap each other extend in one direction and another direction along the sheet width direction,
wherein the program causes a computer to execute:
  forming an image on at least one of the front and second surfaces;
  forming marks for position detection on the front and second surfaces, wherein the marks are formed in four corners of the first detection range and in four corners of the second detection range;
  reading the front surface using the first line sensor and reading the back surface using the second line sensor;
  storing, in a storage, relative positional information between a position detected by the first line sensor and a position detected by the second line sensor, wherein
    the relative positional information is measured based on images that are formed on the sheet with a width smaller than a region in which the first and second detection ranges overlap each other and that are read by the first and second line sensors;
  calculating:
    a positional deviation between the images formed on the front and back surfaces based on positions of the marks on the front surface read by the first line sensor and positions of the marks on the back surface read by the second line sensor;
    a size of the sheet read by the second line sensor from a sheet edge position detected by the first line sensor and the relative positional information; and
    a size of the sheet read by the first line sensor from a sheet edge position detected by the second line sensor and the relative positional information; and
  adjusting positions of the images formed on the front and back surfaces.

* * * * *